US 9,934,056 B2

(12) United States Patent
Noel et al.

(10) Patent No.: US 9,934,056 B2
(45) Date of Patent: Apr. 3, 2018

(54) NON-BLOCKING UNIDIRECTIONAL MULTI-QUEUE VIRTUAL MACHINE MIGRATION (71) Applicant: Red Hat Israel, Ltd., Ra'anana (IL)

(72) Inventors: Karen Noel, Pembroke, NH (US); Michael S. Tsirkin, Ra'anana (IL)

(73) Assignee: RED HAT ISRAEL, LTD., Ra'Anana (IL)

( * ) Notice: Subject to any disclaimer, the term of this patent is extended or adjusted under 35 U.S.C. 154(b) by 494 days.

(21) Appl. No.: 14/148,434

(22) Filed: Jan. 6, 2014

(65) Prior Publication Data
US 2015/0193248 A1 Jul. 9, 2015

(51) Int. Cl.
*G06F 9/455* (2006.01)

(52) U.S. Cl.
CPC .. *G06F 9/45558* (2013.01); *G06F 2009/4557* (2013.01)

(58) Field of Classification Search
None
See application file for complete search history.

(56) References Cited

U.S. PATENT DOCUMENTS

| 7,716,530 | B2 | 5/2010 | Verbowski et al. |
| 8,307,192 | B2 | 11/2012 | Pandey et al. |
| 8,385,202 | B2 | 2/2013 | Kuik et al. |
| 8,489,699 | B2 | 7/2013 | Goggin et al. |
| 8,560,826 | B2 * | 10/2013 | Wu ................... G06F 9/4401 713/1 |
| 8,671,238 | B2 * | 3/2014 | Mashtizadeh ....... G06F 9/45558 711/149 |
| 8,689,211 | B2 * | 4/2014 | Agbaria ................ G06F 9/4856 718/1 |
| 8,719,800 | B2 | 5/2014 | Chow et al. |

(Continued)

FOREIGN PATENT DOCUMENTS

EP 2309387 A1 4/2011

OTHER PUBLICATIONS

Oberheide et al. "Empirical exploitation of live virtual machine migration." Proc. of BlackHat DC convention. 2008. Retrieved on [Nov. 6, 2017]. Retrieved from the Internet: URL<http://vhosts.eecs.umich.edu/fjgroup//pubs/blackhat08-migration.pdf>.*

(Continued)

*Primary Examiner* — Thuy Dao
*Assistant Examiner* — Cheneca Smith
(74) *Attorney, Agent, or Firm* — Haynes and Boone, LLP (57) ABSTRACT Methods, systems, and computer program products for non-blocking unidirectional multi-queue virtual machine migration are provided. A computer-implemented method may include maintaining information to track an association between a memory area in a virtual machine and a stream for a first stage of virtual machine migration, detecting one or more updates to the memory area during the first stage of migration, examining the information to identify the stream associated with the memory area for the first stage of migration, sending the updates to the memory area on the identified stream during the first stage of migration, modifying the information to associate the memory area with a new stream for a second stage of the migration, and sending updates to the memory area on the new stream during the second stage of migration.

20 Claims, 6 Drawing Sheets

(56) References Cited

U.S. PATENT DOCUMENTS

| | | | |
|---|---|---|---|
| 9,563,481 B2* | 2/2017 | Garza | G06F 9/5077 |
| 2006/0026577 A1 | 2/2006 | Dinechin et al. | |
| 2009/0063749 A1* | 3/2009 | Dow | G06F 12/08 |
| | | | 711/6 |
| 2012/0017031 A1* | 1/2012 | Mashtizadeh | G06F 9/45558 |
| | | | 711/6 |
| 2012/0054409 A1* | 3/2012 | Block | G06F 11/1484 |
| | | | 711/6 |
| 2012/0166644 A1 | 6/2012 | Liu et al. | |
| 2012/0185856 A1* | 7/2012 | Ashihara | G06F 9/4856 |
| | | | 718/1 |
| 2012/0324442 A1 | 12/2012 | Barde | |
| 2013/0138764 A1* | 5/2013 | Satapathy | G06F 9/45558 |
| | | | 709/214 |
| 2013/0305241 A1* | 11/2013 | Chandrakar | G06F 9/45533 |
| | | | 718/1 |
| 2014/0282439 A1 | 9/2014 | Kannan | |
| 2015/0046589 A1* | 2/2015 | Garza | G06F 9/5077 |
| | | | 709/226 |
| 2015/0135175 A1* | 5/2015 | Bacher | G06F 9/45558 |
| | | | 718/1 |

OTHER PUBLICATIONS

Shi et al. "vCUDA: GPU-accelerated high-performance computing in virtual machines." IEEE Transactions on Computers 61.6 (2012): 804-816. Retrieved on [Nov. 6, 2017]. Retrieved from the Internet: URL<http://ieeexplore.ieee.org/abstract/document/5928326/>.*

Caspi, Eylon, et al., Stream Computations Organized for Reconfigurable Execution (SCORE): Introduction and Tutorial, U.C. Berkeley BRASS Group, http://web.mit.edu/~mmt/Public/papers/score_tutorial.pdf, Aug. 25, 2000, 31 pages.

Clark, Christopher, et al., Live Migration of Virtual Machines, USENIX Association, $2^{nd}$ Symposium on Networked Systems Design & Implementation, NSDI 2005, pp. 273-286, 14 pages.

Zhao, Ming, et al., Experimental Study of Virtual Machine Migration in Support of Reservation of Cluster Resources, Advanced Computing and Information Systems Laboratory (ACIS) Electrical and Computer Engineering, University of Florida, http://users.cis.fiu.edu/~zhaom/research/vtdc07.pdf, 8 pages.

Broadcom, Broadcom Ethernet Network Controller Enhanced Virtualization Functionality, http://www/broadcom.com/collateral/wp/Virtualization-WP100-R.pdf, Oct. 2009, 10 pages.

Riteau, Pierre, et al., Shrinker: Efficient Wide-Area Live Virtual Machine Migration Using Distributed Content-Based Addressing, Universite de Rennes I, http://hal.inria.fr/inria-00454727/, 2010, 24 pages.

Microsoft, Virtual Machine Live Migration Overview, http://technet.microsoft.com/en-us/library/hh831435.aspx, Feb. 29, 2012, 7 pages.

Ye, Kejiang, et al., VC-Migration: Live Migration of Virtual Clusters in the Cloud, College of Computer Science, Zhejiang University Hangzhou, 2012 ACM/IEEE $13^{th}$ International Conference on Grid Computing, http://www.academia.edu/2062161/VC-Migration_Live_Migration_of_Virtual_Clusters_in_the_Cloud, 2012, 10 pages.

Arye, Matvey, et al., A Formally-Verified Migration Protocol for Mobile, Multi-Homed Hosts, Appeared in $20^{th}$ IEEE International Conference on Network Protocols (ICNP '12), http://www.cs.princeton.edu/~enordstr/papers/icnp12.pdf, 2012, 12 pages.

Sturm, Simon, Interconnect Adapter State Migration for Virtual HPC Clusters, Karlsruher Institut fur Technologie (KIT), http://os.ibds.kit.edu/downloads/da_2013_sturm-simon_interconnect-adapter.pdf, 2013, 88 pages.

* cited by examiner

NON-BLOCKING UNIDIRECTIONAL MULTI-QUEUE VIRTUAL MACHINE MIGRATION

TECHNICAL FIELD

Examples of the present disclosure generally relate to virtual machines, and more specifically, relate to virtual machine migration.

BACKGROUND

A virtual machine is a software-based implementation of a physical computing environment that includes its own virtual resources (e.g., CPU, RAM, disk storage, network connectivity). It may be useful to migrate a virtual machine to a different physical host or to another location on the same host. For example, virtual machine migration may facilitate load balancing, computer system maintenance, energy conservation, geographic relocation, and business continuity.

Virtual machine migration performed over a standard TCP connection is usually limited by flow control, which throttles the data transfer rate to guarantee reliable delivery. In addition, TCP processing errors can disrupt the speed of data transfer. These inefficiencies increase the duration of virtual machine migration and also the risk that virtual machine state may not converge during live migration.

BRIEF DESCRIPTION OF THE DRAWINGS

The present disclosure is illustrated by way of example, and not by way of limitation, and can be understood more fully from the detailed description given below and from the accompanying drawings of various examples provided herein. In the drawings, like reference numbers may indicate identical or functionally similar elements. The drawing in which an element first appears is generally indicated by the left-most digit in the corresponding reference number.

DETAILED DESCRIPTION

Disclosed herein are systems, methods, and computer program products for providing non-blocking unidirectional multi-queue virtual machine migration.

In an example, a virtual machine on a source hypervisor may be migrated to a destination hypervisor using a plurality of streams. For example, memory state of a virtual machine may be transferred in parallel over multiple streams to increase migration performance. In addition, using multiple streams allows data transfer to continue when some streams encounter delays.

In an example, a source hypervisor maintains an association between each memory area in a virtual machine and a stream from one or more available streams during a first stage of virtual machine migration. For example, the source hypervisor may map each memory area to a single stream for the first stage of the virtual machine migration and track the mapping information.

In an example, the source hypervisor detects an update to a memory area of the virtual machine during the first stage. The source hypervisor then examines the mapping information to identify the stream associated with the memory area for the first stage. The source hypervisor then sends the memory area update to a destination hypervisor on the identified stream.

In an example, the source hypervisor detects one or more additional updates to the same memory area during the first stage of the migration. In one example, the source hypervisor sends each subsequent update of the memory area to the destination hypervisor on the same identified stream associated with the memory area for the first stage of the migration.

In an example, the source hypervisor may periodically redistribute update activity across a set of available streams during migration of a virtual machine. For example, the source hypervisor may detect imbalanced stream utilization, receive notification of a newly available stream, or receive notification that one or more streams will become unavailable. In one example, a source hypervisor remaps each of one or more memory areas of a virtual machine to a new stream to balance memory update activity across a set of available streams.

In an example, the source hypervisor modifies the mapping information to associate each of a plurality of memory areas with a different stream for a second stage of migrating a virtual machine. For example, the memory area updated during the first stage of the migration may be mapped to a different stream for a second stage of the migration. In one example, the source hypervisor detects an update to memory area during the second stage of the migration.

In an example, the source hypervisor examines the modified mapping information to identify a stream associated with the memory area for the second stage. The source hypervisor then sends the update to a destination hypervisor on the stream identified as being associated with the memory area for the second stage. In one example, the source hypervisor continues to send subsequent updates to the memory area occurring during the second stage of the migration over the same stream associated with the memory area for the second stage of the migration.

In an example, the source hypervisor may continue to adjust memory area and stream mappings in any number of stages where updates to a memory area are sent over the same stream during each particular stage. The source hypervisor also may maintain and send migration stage identifier information with memory area updates to allow a destination hypervisor to preserve ordering when applying the updates to a virtual machine on the destination hypervisor.

In an example, a destination hypervisor receives memory area updates and associated stage identifiers from a source hypervisor. The destination hypervisor may apply the updates and maintain a latest migration stage used to update each memory area of a virtual machine on the destination hypervisor. The destination hypervisor may compare the stage identifier of an incoming memory area update to the latest migration stage that was used to update a corresponding memory area on the destination hypervisor virtual machine when determining whether to apply the incoming update. In one example, the destination hypervisor may discard (e.g., ignore) incoming updates from earlier stages and apply incoming updates from a current or later migration stage.

Various illustrations of the present disclosure will be understood more fully from the detailed description given below and from the accompanying drawings of various examples described herein. In the drawings, like reference numbers may indicate identical or functionally similar elements. The drawing in which an element first appears is generally indicated by the left-most digit in the corresponding reference number.

Figure 1:
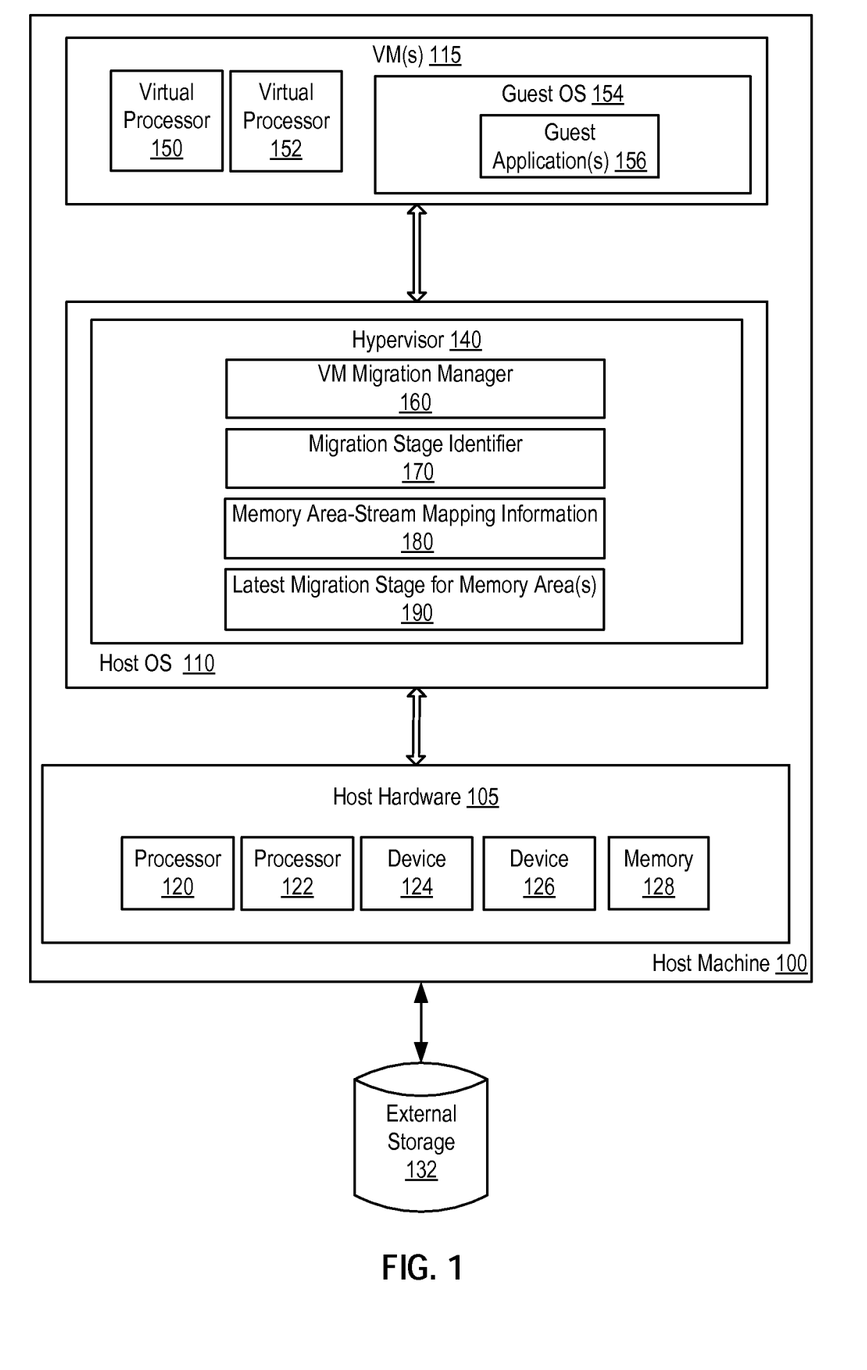
FIG. 1 is a block diagram illustrating an example of a computer system that hosts one or more virtual machines.

FIG. 1 is a block diagram that illustrates an example of a physical computer system, referred to herein as a host machine 100, that hosts one or more virtual machines (VMs) 115. Host machine 100 may be a rackmount server, a workstation, a desktop computer, a notebook computer, a tablet computer, a game console, a mobile phone, a palm-sized computing device, a personal digital assistant (PDA), etc.

Host machine 100 includes host hardware 105, which includes multiple processors 120, 122, multiple devices 124, 126, memory 128, and other hardware components. Memory 124 may include volatile memory devices (e.g., random access memory (RAM)), non-volatile memory devices (e.g., flash memory), and/or other types of memory devices. Host hardware 105 also may be coupled to external storage 132 via a direct connection or a local network. Host machine 100 may be a single machine or multiple host machines arranged in a cluster.

The term "processor," as used herein, refers to a single processor core. Each processor 120, 122 may be a processor core of a microprocessor, central processing unit (CPU), or the like. Some processors may be different processing cores of a processing device that consists of a single integrated circuit. Some processors may be components of a multi-chip module (e.g., in which separate microprocessor dies are included in a single package). Additionally, processors may have distinct dies and packaging, and be connected via circuitry such as discrete circuitry and/or a circuit board.

The term "processing device" is used herein to refer to any combination of one or more integrated circuits and/or packages that include one or more processors (e.g., one or more processor cores). Therefore, the term processing device encompasses a single core CPU, a multi-core CPU and a massively multi-core system that includes many interconnected integrated circuits, each of which may include multiple processor cores.

In one example, processors 120, 122 are processor cores of the same integrated circuit and share a socket. Processors that share a socket may communicate with one another more efficiently than processors that do not share a socket.

Each of the devices 124, 126 may be a physical device that is internal or external to host machine 100. Examples of internal devices include a graphics card, hardware RAID controller, network controller, secondary storage (e.g., hard disk drive, magnetic or optical storage based disks, tapes or hard drives), universal serial bus (USB) devices, internal input/output (I/O) devices, etc. Examples of external devices include a keyboard, mouse, speaker, external hard drive (e.g., external storage 132), external I/O devices, etc. Devices 124, 126 communicate with host machine 100 (e.g., notify host machine 100 of events) by generating device interrupts.

Host machine 100 includes a hypervisor 140 (also known as a virtual machine monitor (VMM)). In one example (as shown), hypervisor 140 is a component of a host operating system 110. Alternatively, hypervisor 140 may run on top of a host OS 110, or may run directly on host hardware 105 without the use of a host OS 110.

Hypervisor 140 manages system resources, including access to memory 128, devices 124, 126, secondary storage, and so on. Hypervisor 140, though usually implemented in software, may emulate and export a bare machine interface (host hardware 105) to higher-level software. Such higher-level software may comprise a standard or real-time operating system (OS), may be a highly stripped down operating environment with limited operating system functionality, may not include traditional OS facilities, etc. Hypervisor 140 presents to other software (i.e., "guest" software) the abstraction of one or more virtual machines (VMs) 115, which may provide the same or different abstractions to various guest software (e.g., guest operating system, guest applications).

Host machine 100 hosts any number of virtual machines (VMs) 115 (e.g., a single VM, one hundred VMs, etc.). A virtual machine 115 is a combination of guest software that uses an underlying emulation of host machine 100 (e.g., as provided by hypervisor 140). Guest software may include a guest operating system 154, guest applications 156, guest device drivers (not shown), etc. Virtual machines 115 can be, for example, hardware emulation, full virtualization, para-virtualization, and operating system-level virtualization virtual machines. Virtual machines 115 may have the same or different guest operating systems 154, such as Linux®, Solaris®, Microsoft® Windows®, etc.

Each virtual machine 115 may include multiple virtual processors 150, 152. Each virtual processor 150, 152 of a virtual machine 115 executes on a specific processor 120, 122 of host machine 100. Hypervisor 140 may control which virtual processors 150, 152 run on which hardware processors 120, 122. For example, virtual processor 150 may run on processor 120, and virtual processor 152 may run on processor 122 (or vice versa).

Hypervisor 140 includes virtual machine (VM) migration manager 160, migration stage identifier 170, memory area-stream mapping information 180, and latest migration stage for memory area(s) 190. Hypervisor 140 may use VM migration manager 160 to migrate virtual machines. Hypervisor 140 may use migration stage identifier 170 to track a current migration stage when migrating a virtual machine. Hypervisor 140 may use memory area-stream mapping information 180 to track associations between each of a plurality of memory areas in a virtual machine and a stream from a plurality of streams. Hypervisor 140 may use latest migration stage for memory area(s) 190, for example, to track the migration stage of the most recent update applied to each memory area of a virtual machine on a destination hypervisor.

Virtual machine migration generally describes the copying of virtual machine memory state from a source hypervisor to a destination hypervisor. For example, a virtual machine may be migrated to a different location on the same physical host or to a different physical host. Further, virtual machines (VMs 115) may be migrated online or offline.

In an example, offline virtual machine migration is performed by suspending activity on a virtual machine, transferring a copy of the virtual machine's memory image from a source hypervisor to a destination hypervisor (e.g., on the same host as the source hypervisor or on a different host), and resuming the virtual machine and processing at the destination destination hypervisor. Offline virtual machine migration requires downtime to transfer a suspended virtual machine's memory state from the source hypervisor to the destination hypervisor.

Online virtual machine migration, often called "live migration," allows a virtual machine to continue running and to remain available to clients while the virtual machine's state is iteratively copied to a destination hypervisor. In an example, a source hypervisor 140 on a source host may copy a first point in time snapshot of a virtual machine's memory state to a destination hypervisor on the same host or a destination hypervisor on a different host. Hypervisor 140 also may detect and track modifications to the virtual machine's memory state that occur as an online virtual machine continues to process client requests.

In an example, a source hypervisor 140 transfers a copy of modified memory areas to a destination hypervisor 140 while continuing to detect and track a next set of modifications to a virtual machine's memory state. For example, a source hypervisor 140 may transfer virtual machine memory state updates to a destination hypervisor 140 in one or more sequential stages during live migration. The process may continue until the active memory state of a virtual machine on a source hypervisor 140 converges with the memory state of a virtual machine on a destination hypervisor 140.

In an example, a source hypervisor 140 may quiesce or briefly suspend a virtual machine on the source hypervisor 140 while a minimal and final set of remaining updates are transferred to the destination hypervisor 140. Virtual machine processing then resumes on the destination hypervisor 140 where clients are automatically and seamlessly reconnected. In one example, a final cut-over phase may occur in a period of milliseconds so that the transition from the source hypervisor to the destination hypervisor is unnoticeable to clients.

A hypervisor 140 may use a VM migration manager 160 to migrate a virtual machine. For example, VM migration manager 160 may create a plurality of streams to connect a source hypervisor 140 on a source host with a destination hypervisor 140 on a destination host. In an example, VM migration manager 160 may create new streams, enable streams, disable streams, close streams, and send notifications to inform source and destination hypervisors 140 about a status of one or more streams.

In an example, a source hypervisor 140 may use VM migration manager 160 to send state of a virtual machine (e.g., memory, CPU, devices, etc.) to a destination hypervisor 140 on the same host or on a different host during live migration. For example, a source hypervisor 140 may use VM migration manager 160 to transfer memory state of a virtual machine in segments over a plurality of streams to a destination hypervisor 140.

A "segment" generally refers to any subset, portion, piece, or region of a virtual machine's memory state. Such "areas of memory" or "memory areas" may include, but are not limited to one or more pages, blocks, extents, or any other measurable unit(s) corresponding to the state of a virtual machine. In one example, state of a virtual machine is not limited to memory per se and also may include, for example, state of one or more virtual processors, state of one or more virtual devices, etc.

A source hypervisor 140 also may use VM migration manager 160 detect and track areas of memory that have changed on a virtual machine over time. In an example, VM migration manager 160 detects and tracks memory pages that have been updated during live migration of a virtual machine. For example, VM migration manager 160 may iteratively scan the memory state of a virtual machine to determine which pages have changed since its most recent scan.

In an example, a VM migration manager 160 of a source hypervisor 140 may use scan identifiers (e.g., scan numbers) to keep track of sequential sets of memory updates corresponding to periodic scans of a virtual machine's memory state. In one example, a scan identifier generally refers to and may be any numeric or alphanumeric field(s), variable(s), counter(s), or any other mechanism that can be used to track and/or indicate a logical ordering or sequence of updates.

In an example, a VM migration manager 160 of a source hypervisor 140 may assign a first scan identifier to a first set of memory updates corresponding to a first memory state of a virtual machine. For example, each memory page in a virtual machine may be assigned or associated with the first scan identifier when a live migration begins. VM migration manager 160 then may begin to transfer a copy of the pages associated with the first scan identifier to a destination hypervisor 140 when performing live migration.

In an example, VM migration manager 160 of a source hypervisor 140 may detect and track memory pages updated during a live migration. For example, at a second point in time, memory pages that have been updated since an initial state (or a most recent scan) are assigned to or associated with a second scan identifier corresponding to the second memory state of the virtual machine. VM migration manager 160 then may begin transferring a copy of the updated memory pages (memory updates) associated with the second scan identifier to a destination hypervisor 140.

In one example, VM migration manager 160 of a source hypervisor 140 continues tracking and transferring memory updates throughout a live migration. Such processing may, for example, continue until a virtual machine's memory state is mostly or entirely synchronized with a virtual machine of a destination hypervisor (for example, so that processing can be transitioned to the destination hypervisor in a brief, final cut-over that is unnoticeable to clients).

In an example, a VM migration manager 160 of a source hypervisor 140 may send memory updates corresponding to a memory state of a virtual machine to a destination hypervisor 140 over a plurality of streams. In one example, VM migration manager 160 sends the memory updates unidirectionally over the plurality of streams. Transferring the memory state of a virtual machine unidirectionally over a plurality of streams provides several benefits. For example, the memory state of a virtual machine may be transferred in parallel over multiple streams, which provides better performance than a single connection. Unidirectional data transfer allows data to be transferred continuously without waiting for acknowledgment from the destination. In addition, various streams can be configured to utilize different network paths to load balance data transfer and to more effectively utilize available network resources. Further, streams may be configured to utilize different network resources to provide increased stability and to guard against failure.

In an example, VM migration manager 160 maps each memory area (e.g., each page of memory) in a virtual machine to an available stream from a set of one or more streams. For example, VM migration manager 160 may create an association between a memory area and a stream so that data and updates corresponding to the memory area are sent over the associated stream. In one example, each stream may be mapped to one or more different memory areas to distribute processing of memory area updates across the streams.

In an example, VM migration manager 160 sends multiple updates to a memory area over the same stream during a stage of virtual machine migration. For example, VM migration manager 160 may send multiple updates to a memory area (e.g., from different scans) on the same stream throughout a single stage of virtual machine migration. In one example, VM migration manager 160 continues to send updates to the memory area on the same stream when the migration stage has not been updated.

In an example, a memory area may be associated with a different stream in a second stage of virtual machine migration. In one example, VM migration manager 160 sends each update to the memory area that occurs during the second stage of the migration to a destination hypervisor 140 on the different stream associated with the memory area for the second stage.

Updates to a memory area may be sent on the same stream throughout a migration stage to ensure that the updates are received in order by a destination hypervisor. For example, destination processing may be simplified by ensuring that updates for each memory area will be sent and received sequentially on the same stream during a migration stage. In contrast, when different updates to the same memory area are sent over different streams during the same stage, ordering information for each update, such as a scan identifier, should be provided to ensure that the updates are not applied out of order at the destination.

In an example, VM migration manager 160 maintains memory area-stream mapping information 180 to track an association (i.e., mapping) between each memory area address and an available stream. VM migration manager 160 then may reference memory area-stream mapping information 180 to determine a stream associated with a particular memory area. For example, VM migration manager 160 may determine a stream that is associated with a memory area for a current migration stage and send an update for the memory area on the stream when performing live migration of a virtual machine.

In an example, memory area-stream mapping information 180 may be any data structure or storage area (e.g., array, hash table, look-up table, etc.) used to store an association between each memory area in a virtual machine and a stream. In one example, memory area-stream mapping information 180 may be based on a function. For example, VM migration manager 160 may use a function that returns memory area-stream mapping information 180 to determine a stream that is associated with a particular memory area.

In an example, VM migration manager 160 may associate each of a plurality of memory areas in a virtual machine with a stream by dividing memory areas across available streams. For example, VM migration manager 160 may assign a set of 1000 memory areas equally across 4 available streams by associating each available stream with 250 memory areas from the set (e.g., in blocks, randomly, round robin, etc.). In another example, VM migration manager 160 also may assign memory areas based page utilization (e.g., to balance page updates across a set of streams).

In an example, VM migration manager 160 may use historical page utilization information to assign memory areas across a set of available streams. For example, VM migration manager 160 may sort a list of pages, for example, based on how frequently each page was updated during a period of time. VM migration manager 160 then may associate each memory area with an available stream, for example, on a round robin basis, in order from most utilized page to least utilized page. Such distribution of memory areas across streams may be used, for example, to improve performance of virtual machine migration by balancing update activity across the streams as evenly as possible based on historical information.

In an example, VM migration manager 160 may periodically modify an association between each of a plurality of memory areas in a virtual machine and a stream. For example, VM migration manager 160 may remap or reassign a memory area to another stream during migration of a virtual machine. In one example, VM migration manager 160 may associate a memory area with a different stream when redistributing live migration activity across streams, for example, when a number of available streams increases or decreases.

In an example, VM migration manager 160 initiates a new migration stage when modifying "memory area-stream" mappings. In one example, VM migration manager 160 splits live migration of a virtual machine into multiple, logical stages that are each associated with a different set of mappings between each of a plurality of memory areas in a virtual machine and one or more available streams.

In an example, VM migration manager 160 may initiate a new stage of virtual machine migration by redefining an association between each of a plurality of memory areas in a virtual machine and a stream (e.g., from a set of available streams). For example, VM migration manager 160 may remap associations between memory areas and streams when a number of available streams changes, or when detecting an idle stream, an over-utilized stream, an under-utilized stream, etc.

In an example, VM migration manager 160 may remap memory area and stream associations and initiate a new stage of virtual machine migration in response to a change in virtual machine migration processing. For example, VM migration manager 160 may use a first migration stage and an initial set of memory area-stream mappings for a warm-up phase of virtual machine where memory pages are copied from a virtual machine on a source hypervisor 140 to a virtual machine on a destination hypervisor 140.

In one example, VM migration manager 160 may initiate one or more new virtual machine migration stages throughout a warm-up phase. For example, VM migration manager 160 may initiate a new stage based on a fixed event, such as when a new scan is performed on a virtual machine of a source hypervisor 140. VM migration manager 160 also may initiate a new stage based on a detected event. For example, VM migration manager 160 may initiate a new stage and in response to detecting imbalanced utilization of streams.

In an example, VM migration manager 160 also may initiate one or more new stages during a stop and copy phase when remaining dirty pages are copied from a virtual machine on a source hypervisor 140 to a virtual machine on a destination hypervisor 140. VM migration manager 160 also may initiate one or more new stages during post-copy migration when execution state, such as CPU state and non-pageable memory is copied to a destination virtual machine. In one example, VM migration manager 160 may initiate a new stage in response to a command received, from a source hypervisor 140, destination hypervisor, and/or a management application.

In an example, VM migration manager 160 uses a single stream for live migration until the migration reaches a stop and copy phase where remaining dirty pages are copied from a virtual machine on a source hypervisor 140 to a virtual machine on a destination hypervisor 140. When the migration reaches the stop and copy phase, VM migration manager 160 then may begin to use multiple streams. In one example, a destination hypervisor 140 may use a bit for each memory area in latest migration stage for memory area(s) 190 to track the stage of the latest update for the memory area applied to a destination virtual machine.

In an example, VM migration manager 160 tracks a current migration stage using migration stage identifier 170. In one example, memory area-stream mapping information 180 does not change throughout a migration stage. Thus, multiple updates to the same memory area are sent over the same stream, in order, when the migration stage remains unchanged.

In an example, memory-area stream mapping information 180 is updated for a new migration stage. In one example, when updates to a memory area are sent over different streams due to a migration stage transition, then the possibility exists that the updates may be received out of order at the destination hypervisor 140. In an example, VM migration manager 160 may track and send migration stage identifiers 170 to a destination hypervisor 140 to preserve ordering of memory area updates across different stages since updates to the same memory area may be received out of order on different streams.

In an example, VM migration manager 160 sends a migration stage identifier 170 associated with a memory state of a virtual machine on a source hypervisor 140 with each memory update that it sends on a selected stream. In one example, VM migration manager 160 sends a migration stage identifier 170 associated with each updated memory page sent on a selected stream during a live migration comprising multiple stages with different memory area-stream mappings.

In an example, VM migration manager 160 may send a migration stage identifier 170 only once on a stream for one or more memory updates occurring during the corresponding stage. For example, VM migration manager 160 may send a stage identifier 170 once on each of a plurality of streams, for example, when beginning a new stage of virtual machine migration processing.

A destination hypervisor 140 may receive memory updates corresponding to a memory state of a virtual machine, for example, during live migration. In an example, a destination hypervisor 140 uses VM migration manager 160 to receive, prioritize, and apply the memory updates to synchronize memory state of a virtual machine on a source hypervisor 140 with a virtual machine on a destination hypervisor 140.

In an example, a destination hypervisor 140 on a destination host receives memory updates sent unidirectionally from a source hypervisor 140 on a source host. For example, memory updates may flow from the source hypervisor 140 to the destination hypervisor 140 without acknowledgment or response by the destination hypervisor 140.

In an example, a destination hypervisor 140 may use VM migration manager 160 to monitor streams for incoming memory updates and a migration stage identifier 170 associated with each of the memory updates. A destination hypervisor 140 also may use VM migration manager 160 to prioritize and process incoming memory updates, for example, in view of migration stage identifiers associated with each of the memory area updates.

In an example, a VM migration manager 160 of a destination hypervisor 140 receives memory updates corresponding to one or more memory states of a virtual machine on a plurality of streams that connect a source hypervisor 140 with the destination hypervisor 140. In one example, a destination hypervisor 140 may use VM migration manager 160 to prioritize and apply memory updates received via the streams to a virtual machine during migration.

In an example, VM migration manager 160 of a destination hypervisor maintains a reserved area of destination hypervisor 140 memory to track a latest migration stage for memory area(s) 190. For example, VM migration manager 160 may track a migration stage for the last update applied to a memory area of a virtual machine on a destination hypervisor 140.

In an example, VM migration manager 160 may compare a migration stage identifier 170 of an incoming update for a memory area with a corresponding entry in latest migration stage for memory area(s) 190 to determine whether to apply the update. In one example, a VM migration manager 160 may apply the update when it determines that the stage of an incoming update is the same as or later than the most recent update applied to the memory area on a destination virtual machine. In another example, VM migration manager 160 may discard or ignore incoming updates that are from an stage that is earlier than the stage associated with the memory area on the destination virtual machine.

Figure 2:
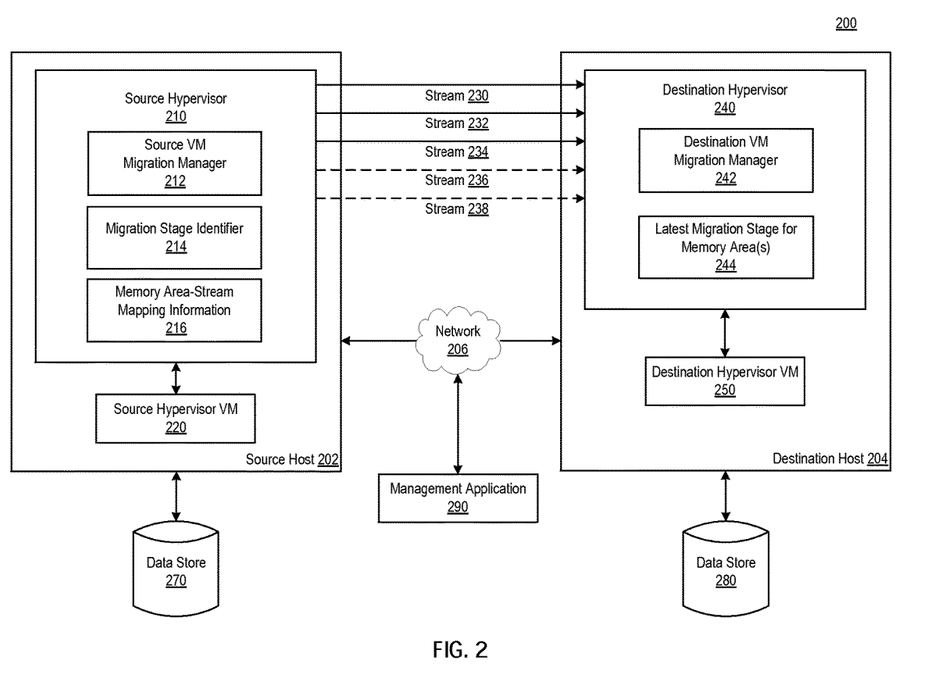
FIG. 2 illustrates an exemplary system architecture for non-blocking unidirectional multi-queue virtual machine migration, in accordance with various examples of the present disclosure.

FIG. 2 is a diagram illustrating an exemplary system architecture 200 for non-blocking unidirectional multi-queue virtual machine (VM) migration, in accordance with various examples of the present disclosure. System architecture 200 includes source host 202, destination host 204, network 206, source hypervisor 210, source VM migration manager 212, migration stage identifier 214, memory area-stream mapping information 216, source hypervisor VM 220, streams (230, 232, 234, 236 and 238), destination hypervisor 240, destination VM migration manager 242, latest migration stage for memory area(s) 244, destination hypervisor VM 250, data store 270, data store 280, and management application 290.

In an example, source host 202 and destination host 204 are physical computing systems connected by network 206. Network 206 may be a public network (e.g., the Internet), a private network (e.g., a local area network (LAN)), a wide area network (WAN)), or a combination thereof.

Source host 202 includes source hypervisor 210, source VM migration manager 212, migration stage identifier 214, memory area-stream mapping information 216, and source hypervisor VM 220. Source host 202 may be coupled to external storage 270 (e.g., network storage) via a direct connection or a local network.

Destination host 204 includes destination hypervisor 240, destination VM migration manager 242, latest migration stage for memory area(s) 244, and destination hypervisor VM 250. Destination host 204 may be coupled to external storage 280 (e.g., network storage) via a direct connection or a local network. In some examples, external storage 270 and 280 may be shared. External storage 270 and 280 also may be non-shared storage.

Management application 290 may include one or more software applications that may be used, for example, by an administrator to initiate and manage one or more aspects of virtual machine migration. For example, management application 290 may be used to select a source hypervisor VM 220 on a source host 202 for migration to a destination hypervisor VM 250 on a destination host 204.

Management application 290 also may be used to define and configure one or more active streams 230, 232 and 234 to migrate a source hypervisor VM 220 to destination hypervisor VM 250. Management application 290 also may be used to create and/or utilize one or more additional (e.g., reserve) streams 236 and 238 as virtual machine migration is performed.

Streams (e.g., 230, 232, 234) are generally any communication path that can be used to transmit data (e.g., to send state of a source hypervisor VM 220 to a destination hypervisor VM 250). For example, a plurality of streams may include, but is not limited to, standard TCP streams (e.g., TCP sockets), unidirectional TCP flows, one or more files, Unix sockets, named pipes, etc. In addition, streams may be processed in parallel by multiple threads or by a single thread, for example, using round-robin processing. In an example, streams 230, 232, 234, 236 and 238 are unidirectional. Thus, data may flow from source hypervisor 210 to destination hypervisor 240 without return communication from destination hypervisor 240.

In an example, source hypervisor VM 220 is migrated to destination hypervisor VM 250 on destination host 204. For example, a memory state of source hypervisor VM 220 may be transferred (i.e., copied) to destination hypervisor VM 250 in an offline migration or a live migration. In one example, a source hypervisor VM 220 is migrated to destination hypervisor VM 250 in a live migration. During the live migration, source hypervisor 210 may monitor and track changes to memory pages of source hypervisor VM 220. For example, source hypervisor 210 may detect or receive notification that one or more memory pages have been updated.

In an example, source hypervisor 210 tracks modified memory pages in a bitmap (e.g., where each bit corresponds to a memory page). Source hypervisor 210 may associate a set of memory page updates with a sequential scan identifier indicating a position in a series of periodic memory updates over time. Source hypervisor 210 sends copies of updated memory pages to destination hypervisor 240 over streams 230, 232 and 234. In one example, source hypervisor 210 clears the bitmap, increments the scan identifier and repeats the process until a live migration can converge.

In an example, source hypervisor 210 may send migration stage identifier(s) 214 to destination hypervisor 240 when two or more streams are active in a live migration. In one example, migration stage identifier 214 information may not be sent to a destination hypervisor 240 when migration is performed using a single stream (e.g., because memory updates may be provided in order on the same stream). In one example, source hypervisor 210 may begin sending migration stage identifier 214 information when a migration that is performed using a single stream is updated or transitions to utilize multiple streams (e.g., streams 230, 232, 234).

In an example, migration stage identifier 214 information may not be sent to destination hypervisor 240 when a migration is comprised of a single stage. For example, when memory area-stream mapping information 216 remains consistent throughout an entire migration, updates for each memory area may be sent, received, and processed in order on the same associated stream, thus ensuring consistency of updates.

In an example, a plurality of streams 230, 232 and 234 may be used to accelerate an offline virtual machine migration. For example, each memory area in a virtual machine may be mapped to one of the streams. In one example, migration stage identifiers are not utilized in an offline, multi-stream virtual machine migration because the virtual machine memory state is suspended and does not change during the migration.

Figure 3:
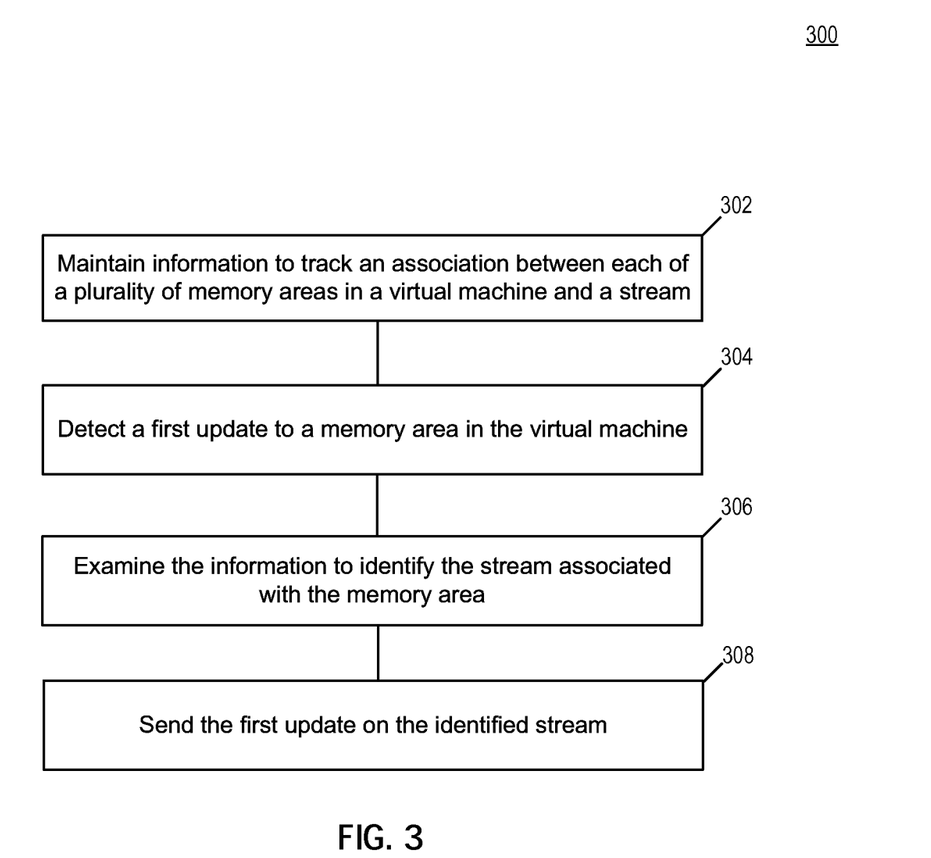
FIG. 3 is a flow diagram illustrating an example of a method for providing non-blocking unidirectional multi-queue virtual machine migration in a hypervisor.

FIG. 3 is a flow diagram illustrating an example of a method for providing non-blocking unidirectional multi-queue virtual machine migration in a hypervisor. The method 300 may be performed by processing logic that may comprise hardware (circuitry, dedicated logic, programmable logic, microcode, etc.), software (such as instructions run on a general purpose computer system, dedicated machine, or processing device), firmware, or a combination thereof. In one example, the method 300 is performed by hypervisor 140 of FIG. 1.

Method 300 begins at block 302 when a source hypervisor 140 maintains information to track an association between each of a plurality of memory areas in a virtual machine and a stream. In an example, a source VM migration manager 212 maintains memory area-stream mapping information 216 to track an association between each of a plurality of memory areas of a source hypervisor VM 220 and an available stream (e.g., 230, 232, 234). In one example, each memory area in a virtual machine may be mapped to a stream so that data corresponding to the memory area is sent over the same stream, for example, during a stage of virtual machine migration.

At block 304, the hypervisor 140 detects a first update to a memory area in the virtual machine. In an example, source VM migration manager 212 detects a first update to a memory area corresponding to a first memory state of source hypervisor VM 220. For example, source VM migration manager 212 may detect the memory area update (e.g., a dirty memory page) when performing a scan of source hypervisor VM 220.

At block 306, the hypervisor 140 examines the information to identify the stream associated with the memory area. In an example, source VM migration manager 212 searches memory area-stream mapping information 216 (e.g., using a memory address or a key) to identify a stream that is associated with the memory area. For example, source VM migration manager 212 may examine memory area-stream mapping information 216 to determine a stream to use for a migration stage when sending an update for the memory area to destination hypervisor 240 during live migration.

At block 308, the hypervisor 140 sends the first update on the identified stream. In an example, source VM migration manager 212 sends the first update for the memory area to destination hypervisor 240 on the stream identified at block 306. In one example, source VM migration manager 212 also may send a migration stage identifier 214 with the first memory update to indicate a migration stage associated with the update. For example, VM migration manager 242 may send migration stage identifier 214 when memory area-stream mapping information 216 is modified across one or more stages of migration.

Figure 4:
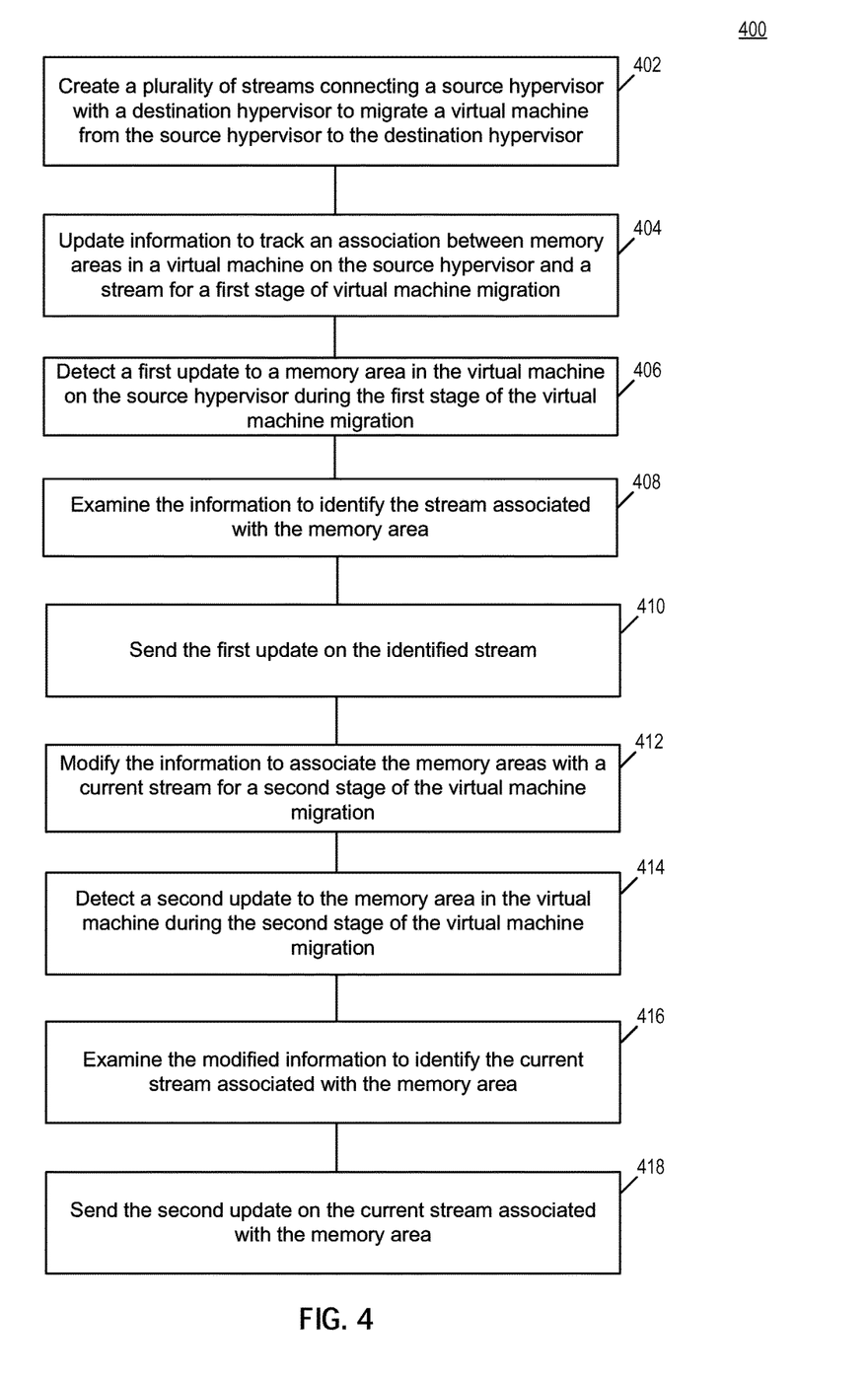
FIG. 4 is a flow diagram illustrating an example of a method for managing memory updates across migration stages when performing non-blocking unidirectional multi-queue virtual machine migration.

FIG. 4 is a flow diagram illustrating an example of a method for managing memory updates across migration stages when performing non-blocking unidirectional multi-queue virtual machine migration. The method 400 may be performed by processing logic that may comprise hardware (circuitry, dedicated logic, programmable logic, microcode, etc.), software (such as instructions run on a general purpose computer system, dedicated machine, or processing device), firmware, or a combination thereof. In one example, the method 400 is performed by the hypervisor 140 of FIG. 1.

Method 400 begins at block 402 when a plurality of streams are created to connect a source hypervisor with a destination hypervisor to migrate a virtual machine from the source hypervisor to the destination hypervisor. In an example, a source hypervisor 210, destination hypervisor 240, or a management application 290 in communication with source hypervisor 210 and destination hypervisor 240 may be used to establish the streams.

In an example, an administrator managing migration of a virtual machine may configure an initial number of streams that connect source hypervisor 210 to destination hypervisor 240. In one example, the administrator may increase or decrease a number of streams at any time, including during migration of source hypervisor VM 220 to destination hypervisor VM 250. For example, new streams may be created, reserve streams may be enabled, enabled streams may be disabled and placed in reserve, and any stream may be closed.

In an example, a source hypervisor 210 and a destination hypervisor 240 also may receive notification that one or more streams have become unavailable. In one example, a source hypervisor 210 does not send data on a disabled or closed stream. In another example, a destination hypervisor 240 does not wait for data on a disabled or closed stream.

At block 404, a source hypervisor 140 updates information to track an association between memory areas in a virtual machine on the source hypervisor 140 and a stream for a first stage of virtual machine migration. In an example, source VM migration manager 212 associates each memory area (e.g., memory page) in a source hypervisor virtual machine (VM) 220 with a stream (e.g., stream 230, 232 or 234). In one example, VM migration manager 212 may create an entry comprising a memory address of a memory area and a stream identifier in memory area-stream mapping information 216 to maintain the association.

In an example, VM migration manager 212 may associate or assign each memory area to a specific stream for each stage of virtual machine migration so that data and updates for a memory area are sent on the same stream throughout a stage. In one example, each memory area may be associated with the same stream for a full live migration of source hypervisor VM 220.

In an example, one or more of the memory areas may be reassigned or associated with a different stream in a new stage of virtual machine migration. For example, while one or more updates to a memory area in source hypervisor VM 220 may be sent over a first stream during a first stage of migration, updates to the same memory area may be sent over a second stream during a second stage of migration (e.g., when memory area-stream mapping information 216 is modified for a new migration stage).

In an example, source VM migration manager 212 associates each of a plurality of memory areas with a stream for a first stage of migrating source hypervisor VM 220 to destination hypervisor VM 250. For example, source VM migration manager 212 may create associations by updating memory-area-stream mapping information 216 prior to or when initiating the first stage of migration. In one example, VM migration manager 212 also may create associations as memory areas are utilized during the first stage of migration.

At block 406, the source hypervisor 140 detects a first update to a memory area in the virtual machine on the source hypervisor during the first stage of the virtual machine migration. In an example, source VM migration manager 212 detects a first update to a memory area corresponding to a first memory state of source hypervisor VM 220. For example, source VM migration manager 212 may detect the first update to the memory area when performing a scan of source hypervisor VM 220 during live migration.

At block 408, the source hypervisor 140 examines the information to identify the stream associated with the memory area. In an example, source VM migration manager 212 examines memory area-stream mapping information 216 to identify a stream that is associated with the memory area. For example, source VM migration manager 212 may examine memory area-stream mapping information 216 to determine which stream to use when sending the first update to destination hypervisor 240 during live migration.

In an example, memory-area stream mapping information 216 remains consistent (i.e., unchanged) during a migration stage so that updates for a particular memory area are sent on the same stream throughout the stage. In one example, sending memory updates over the same stream ensures that the updates will be received in order by destination hypervisor 240. In contrast, when updates for the same memory area are sent on different streams, the updates may be received out of order at destination hypervisor 240 (thus requiring order processing at the destination).

At block 410, the source hypervisor 140 sends the first update on the identified stream. In an example, source VM migration manager 212 sends the first update for the memory area to destination hypervisor 240 on the stream identified at block 408. In one example, source VM migration manager 212 also may send a migration stage identifier 214 with the first memory update to indicate a migration stage associated with the update. In one example, VM migration manager continues to send additional updates to the memory area on the same identified stream for the duration of the migration stage.

At block 412, the source hypervisor 140 modifies the information to associate the memory areas with a current stream for a second stage of the virtual machine migration. In an example, source VM migration manager 212 may initiate a second stage of virtual machine migration where memory area-stream mappings are updated, for example, to accommodate changing conditions. For example, VM migration manager 212 may detect or receive notification of imbalanced stream utilization during live migration. VM migration manager 212 may redistribute assignment of memory areas across available streams, for example, in response to detecting or receiving notification of a change in a number of available streams.

In an example, VM migration manager 212 modifies memory area-stream mapping information 216 by changing or updating one or more associations between each of a plurality of memory areas (e.g., memory pages) and a stream. Thus, one or more memory areas may be associated with (i.e., mapped to) a different stream across each different stage.

In an example, VM migration manager 212 may modify memory area-stream mapping information, for example, prior to or when initiating a second stage of virtual machine migration. In one example, VM migration manager 212 may track a current migration stage using migration stage identifier 214. For example, VM migration manager 212 may provide migration stage identifier 214 with memory updates to allow destination hypervisor 240 to maintain ordering of updates received for the same memory area on different streams.

At block 414, the source hypervisor 140 detects a second update to the memory area in the virtual machine during the second stage of the virtual machine migration. In an example, source VM migration manager 212 detects a second update to a memory area corresponding to a second memory state of source hypervisor VM 220. For example, source VM migration manager 212 may detect the second update to the memory area (e.g., memory page) in a second scan of source hypervisor VM 220 when live migrating source hypervisor VM 220 to destination hypervisor VM 250.

At block 416, the source hypervisor 140 examines the modified information to identify the current stream associated with the memory area. In an example, source VM migration manager 212 may search modified memory area-stream mapping information 216 to find a stream that is associated with the memory area for the second stage of the migration. For example, source VM migration manager 212 may examine memory area-stream mapping information 216 to identify a stream to use when sending the second update for the memory area to destination hypervisor 240 during live migration.

At block 418, the source hypervisor 140 sends the second update on the current stream associated with the memory area. In an example, source VM migration manager 212 sends the second update for the memory area to destination hypervisor 240 on the current stream identified at block 416. In one example, the current stream used to send the second update may be the same stream or a different stream that was used to send the first update at block 410.

Figure 5:
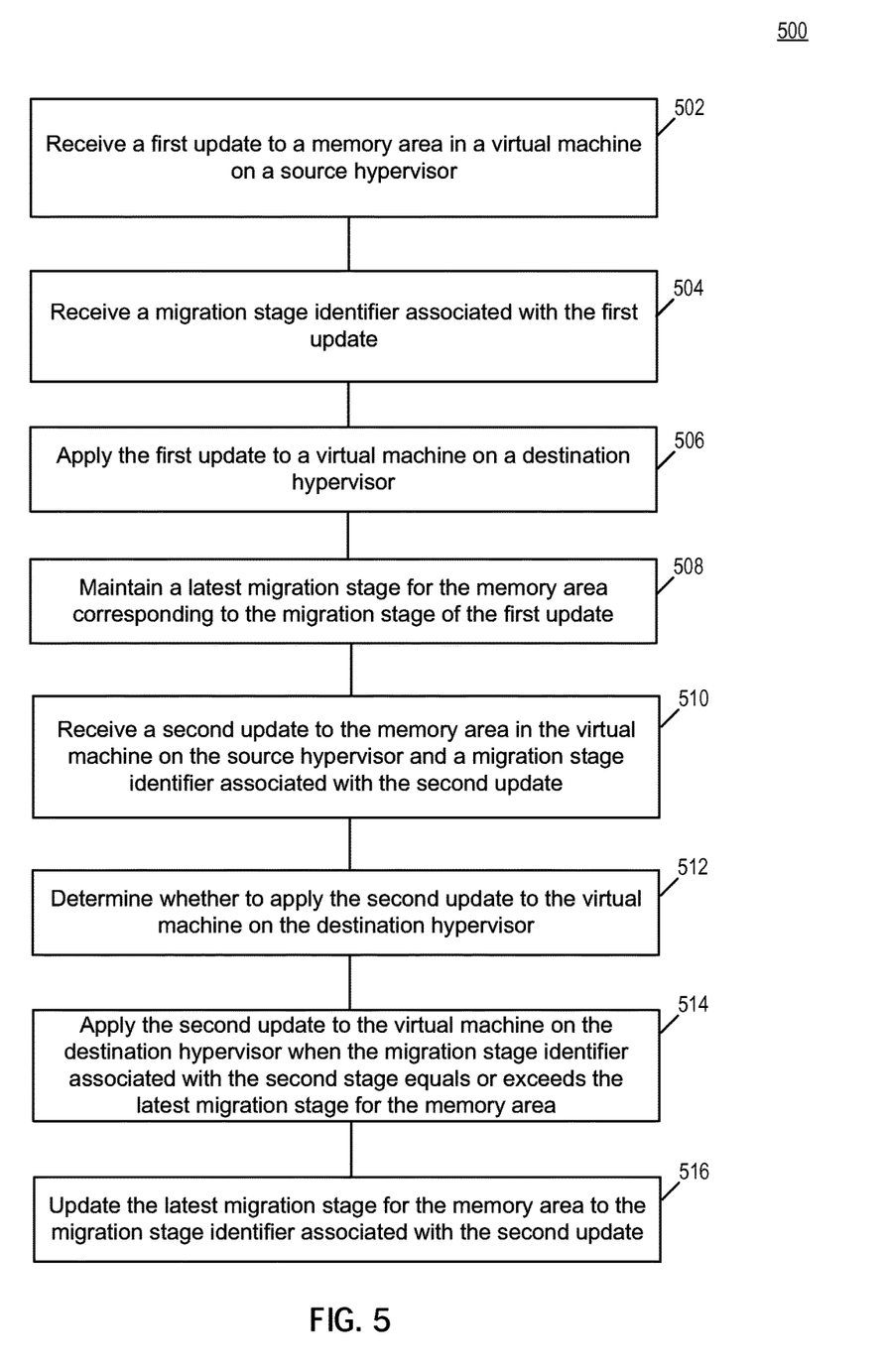
FIG. 5 is a flow diagram illustrating an example of a method for processing memory updates across migration stages when performing non-blocking unidirectional multi-queue virtual machine migration.

FIG. 5 is a flow diagram illustrating an example of a method for processing memory updates across migration stages when performing non-blocking unidirectional multi-queue virtual machine migration. The method 500 may be performed by processing logic that may comprise hardware (circuitry, dedicated logic, programmable logic, microcode, etc.), software (such as instructions run on a general purpose computer system, dedicated machine, or processing device), firmware, or a combination thereof. In one example, the method 500 is performed by the hypervisor 140 of FIG. 1.

At block 502, a destination hypervisor 140 receives a first update to a memory area in a virtual machine on a source hypervisor. In an example, destination hypervisor 240 receives an update for a memory area corresponding to a memory state of a source hypervisor VM 220 on a stream (e.g., 230, 232, 234).

At block 504, the destination hypervisor 140 receives a stage identifier associated with the first update. In an example, destination hypervisor 240 receives a migration stage identifier 214 associated with an update to a memory area. For example, destination hypervisor 240 may receive a stage identifier sent with the update received at block 502. Destination hypervisor 240 also may receive a migration stage identifier 217 from source hypervisor 210 once on each of one or more streams for one or more updates.

At block 506, the destination hypervisor 140 applies the first update to a virtual machine on the destination hypervisor 140. In an example, destination VM migration manager 242 updates the memory state of a destination hypervisor virtual machine 250 by copying the information provided in the first update to a corresponding memory area of destination hypervisor virtual machine 250. For example, destination VM migration manager 242 may modify a memory page on destination hypervisor virtual machine 250 using the first update.

At block 508, the destination hypervisor 140 maintains a latest migration stage for the memory area corresponding to the migration stage of the first update. In an example, destination VM migration manager 242 uses an area of memory (e.g., latest migration stage for memory area(s) 244) in destination hypervisor 240 to track a migration stage identifier 214 of the most recent update applied to the memory area in destination hypervisor VM 250. In one example, latest migration stage for memory area(s) 244 may include, but is not limited to, an array, hash table, look-up table, etc. In an example, latest migration stage for memory area(s) 244 may include a memory address and a corresponding migration stage identifier 214 for each of a plurality of memory areas corresponding to state of a destination hypervisor virtual machine 250.

At block 510, the destination hypervisor 140 receives a second update to the memory area in the virtual machine on the source hypervisor and a migration stage identifier associated with the second update. In an example, destination VM migration manager 242 receives a second update and an associated migration stage identifier 214 for the memory area from source hypervisor 240 on a different stream (e.g., 230, 232, 234) than the first update. For example, the second update may be received on a new stream because the memory area may have been associated (i.e., mapped) to a different stream in a previous migration stage.

At block 512, the destination hypervisor 140 determines whether to apply the second update to the virtual machine on the destination hypervisor. In an example, destination VM migration manager 242 determines whether to apply the second update to destination hypervisor VM 250 by comparing a migration stage identifier 214 for the memory area update (e.g., received at block 510) to a stage identifier for the memory area in latest migration stage for memory area(s) 244.

At block 514, the destination hypervisor 140 applies the second update to the virtual machine on the destination hypervisor when the migration stage identifier associated with the second stage equals or exceeds the latest migration stage maintained for the memory area. In an example, destination VM migration manager 242 applies the second update to destination hypervisor VM 250 when the migration stage identifier 214 for the second update is greater than or equal to the stage identifier of the most recent update applied to the memory area on the destination VM.

In one example, when the migration stage identifier 214 for the second update is greater than the migration stage of the most recent update to the memory area on destination virtual machine, the second update is later than the most recent update and does not conflict with the previous update.

In one example, when the migration stage identifier 214 for the second update is equivalent to the migration stage of the most recent update to the memory area on destination virtual machine, the second update may be applied. For example, updates to a memory area may be received in order on the same stream throughout the same migration stage.

In one example, when the migration stage identifier 214 for the second update is less than the migration stage of the most recent update to the memory area on destination virtual machine, the second update may be discarded. For example, when memory area-stream mapping information 216 is modified for a new stage, it is possible that an earlier update for a memory area may be received after a later update for the same memory area on a different stream. In such instances, the earlier update may be discarded because newer information already has been applied to the corresponding memory area on destination hypervisor VM 250.

At block 516, the destination hypervisor 140 updates the latest migration stage for the memory area to the migration stage identifier associated with the second update. In an example, destination VM migration manager 242 updates the latest migration stage used to update the memory area in destination hypervisor VM 250. For example, VM migration manager 242 may update an entry for the memory area in latest migration stage for memory area(s) 244 with the migration stage identifier associated with the memory area of the second update. In one example, VM migration manager 242 sets a bit associated with a memory area in latest migration stage for memory area(s) 244 when a migration is comprised of two stages.

Figure 6:
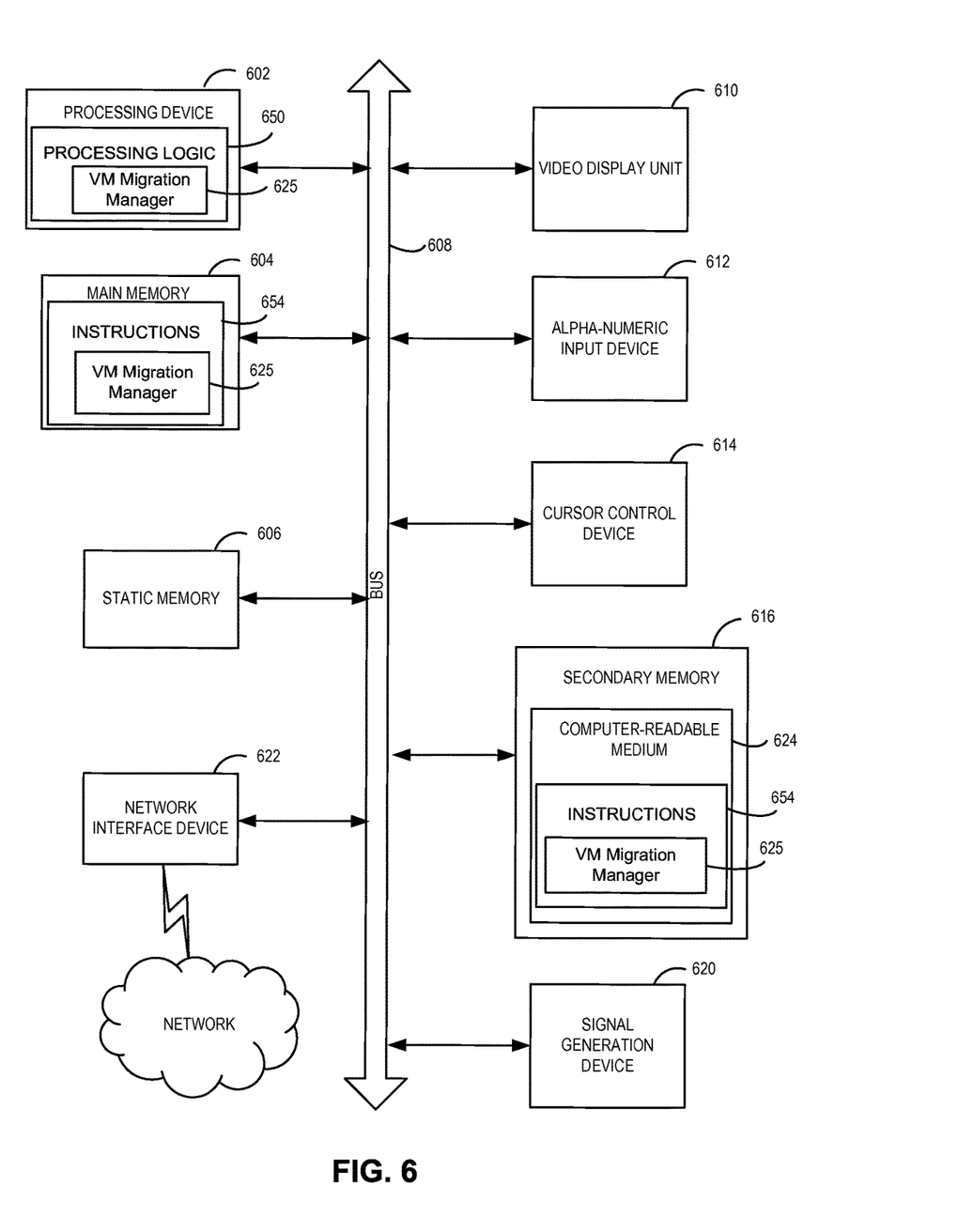
FIG. 6 illustrates a diagrammatic representation of a machine in the exemplary form of a computer system.

FIG. 6 illustrates a diagrammatic representation of a machine in the exemplary form of a computer system 600 within which a set of instructions, for causing the machine to perform any one or more of the methodologies discussed herein, may be executed. The computer system 600 may correspond to host machine 100 of FIG. 1.

In examples of the present disclosure, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a secondary memory 616 (e.g., a data storage device), which communicate with each other via a bus 608.

The processing device 602 represents one or more general-purpose processing devices such as a microprocessor, central processing unit, or the like. The processing device may include multiple processors. The processing device 602 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 602 may also be one or more special-purpose processing devices such as an application specific integrated circuit (ASIC), a field programmable gate array (FPGA), a digital signal processor (DSP), network processor, or the like.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The secondary memory 616 may include a machine-readable storage medium (or more specifically a computer-readable storage medium) 624 on which is stored one or more sets of instructions 654 embodying any one or more of the methodologies or functions described herein (e.g., VM migration manager 625). The instructions 654 may also reside, completely or at least partially, within the main memory 604 and/or within the processing device 602 during execution thereof by the computer system 600 (where the main memory 604 and the processing device 602 constituting machine-readable storage media).

While the computer-readable storage medium 624 is shown as an example to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine that cause the machine to perform any one or more of the operations or methodologies of the present disclosure. The term "computer-readable storage medium" shall accordingly be taken to include, but not be limited to, solid-state memories, and optical and magnetic media.

The computer system 600 may additionally include a VM migration manager module (not shown) for implementing the functionalities of the VM migration manager 160. The modules, components and other features described herein (for example, in relation to FIG. 1) can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

In the foregoing description, numerous details are set forth. It will be apparent, however, to one of ordinary skill in the art having the benefit of this disclosure, that the present disclosure may be practiced without these specific details. In some instances, well-known structures and devices have been shown in block diagram form, rather than in detail, in order to avoid obscuring the present disclosure.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "updating", "determining", "storing", "computing", "comparing", "applying", "creating", "ranking," "classifying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other examples and implementations will be apparent to those of skill in the art upon reading and understanding the above description. The scope of the disclosure should therefore be determined with reference to the appended claims, along with the full scope of equivalents to which such claims are entitled.

What is claimed is:

1. A computer-implemented method, comprising:
maintaining, by a hypervisor executed by a processing device, mapping data to track respective associations between each one of a plurality of memory areas of a virtual machine and one of a plurality of active streams for migrating the virtual machine to a second hypervisor;
creating, by the hypervisor, a first association between a first memory area in the plurality of memory areas and a first active stream from the plurality of active streams, the first association being created in the mapping data for a first phase of the migrating;
creating, by the hypervisor, a second association between a second memory area in the plurality of memory areas and a second active stream from the plurality of active streams, the second association being created in the mapping data for the first phase of the migrating;
sending, by the hypervisor, an update for the first memory area from the first phase of the migrating to the second hypervisor via the first active stream in view of the mapping data;
sending, by the hypervisor, an update for the second memory area from the first phase of the migrating to the second hypervisor via the second active stream in view of the mapping data;
modifying, by the hypervisor, the mapping data for a second phase of the migrating in view of an available third active stream by remapping respective sets of one or more memory areas from the plurality of memory areas across the first active stream, the second active stream, and the third active stream; and
sending, by the hypervisor, respective updates for one or more of the remapped memory areas to the second hypervisor in view of the modified mapping data in association with the second phase of the migrating.

2. The computer-implemented method of claim 1, further comprising:
examining, by the hypervisor, the mapping data to determine which one of the active streams is associated with the first memory area for the first phase of the migrating; and
examining, by the hypervisor, the mapping data to determine which one of the active streams is associated with the second memory area for the first phase of the migrating.

3. The computer-implemented method of claim 1, further comprising:
detecting, by the hypervisor, a second update for the first memory area during the first phase of the migrating; and
sending, by the hypervisor, the second update for the first memory area to the second hypervisor on the first active stream in view of the mapping data.

4. The computer-implemented method of claim 1, further comprising:

initiating, by the hypervisor, the second phase of migrating the virtual machine.

5. The computer-implemented method of claim 4, further comprising:
detecting, by the hypervisor, a second update for the first memory area during the second phase of the migrating;
examining, by the hypervisor, the modified mapping data to identify a current one of the active streams associated with the first memory area for the second phase of the migrating; and
sending, by the hypervisor, the second update for the first memory area to the second hypervisor via the current one of the active streams associated with the first memory area for the second phase of the migrating in view of the examining of the modified mapping data.

6. The computer-implemented method of claim 1, further comprising:
receiving, by the second hypervisor, the update for the first memory area on the first active stream; and
receiving, by the second hypervisor, the update for the second memory area on the second active stream.

7. The computer-implemented method of claim 1, further comprising:
receiving, by the second hypervisor, a migration phase identifier with the update for the first memory area on the first active stream, the migration phase identifier indicating that the update for the first memory area is associated with the first phase of the migrating.

8. The computer-implemented method of claim 7, further comprising:
tracking, by the second hypervisor, a latest migration phase of one or more updates to the first memory area applied to a virtual machine of the second hypervisor.

9. The computer-implemented method of claim 8, wherein the second hypervisor maintains the first phase of the migrating as the latest migration phase for the first memory area when the update for the first memory area is applied to the virtual machine of the second hypervisor.

10. The computer-implemented method of claim 1, further comprising:
receiving, by the second hypervisor, a second update for the first memory area, the second update for the first memory area being associated with the second phase of the migrating; and
determining, by the second hypervisor, whether to apply the second update for the first memory area to the virtual machine of the second hypervisor in view of a migration phase identifier associated with the second update for the first memory area.

11. The computer-implemented method of claim 10, wherein the second hypervisor determines whether to apply the second update for the first memory area based on comparing a latest migration phase associated with the first memory area applied to a virtual machine of the second hypervisor with the migration phase identifier associated with the second update for the first memory area.

12. The computer-implemented method of claim 10, further comprising:
applying, by the second hypervisor, the second update for the first memory area to the virtual machine of the second hypervisor when the migration phase identifier associated with the second update does not precede the latest migration phase associated with the first memory area of the virtual machine of the second hypervisor.

13. The computer-implemented method of claim 12, further comprising:

updating, by the second hypervisor, the latest migration phase for the first memory area to the migration phase identifier associated with the second update for the first memory area.

14. The computer-implemented method of claim 1, further comprising:
creating a plurality of active streams to migrate the virtual machine from the hypervisor to a second hypervisor, wherein each one of the active streams is a different active connection between the first hypervisor and the second hypervisor.

15. The computer-implemented method of claim 14, wherein the hypervisor sends updates made to various memory areas of the virtual machine in parallel via two or more of the active streams when live migrating the virtual machine to a different hypervisor.

16. A non-transitory computer-readable medium having instructions recorded thereon, that when executed by a processing device, cause the processing device to perform operations, comprising:
maintaining, by a hypervisor executed by the processing device, mapping data to track respective associations between each one of a plurality of memory areas of a virtual machine and one of a plurality of active streams for migrating the virtual machine to a second hypervisor;
creating, by the hypervisor, a first association between a first memory area in the plurality of memory areas and a first active stream from the plurality of active streams, the first association being created in the mapping data for a first phase of the migrating;
creating, by the hypervisor, a second association between a second memory area in the plurality of memory areas and a second active stream from the plurality of active streams, the second association being created in the mapping data for the first phase of the migrating;
sending, by the hypervisor, an update for the first memory area from the first phase of the migrating to the second hypervisor via the first active stream in view of the mapping data;
sending, by the hypervisor, an update for the second memory area from the first phase of the migrating to the second hypervisor via the second active stream in view of the mapping data;
modifying, by the hypervisor, the mapping data for a second phase of the migrating in view of an available third active stream by remapping respective sets of one or more memory areas from the plurality of memory areas across the first active stream, the second active stream, and the third active stream; and
sending, by the hypervisor, respective updates for one or more of the remapped memory areas to the second hypervisor in view of the modified mapping data in association with the second phase of the migrating.

17. The non-transitory computer-readable storage medium of claim 16, wherein the update for the first memory area and the update for the second memory area are sent unidirectionally over the respective associated streams in parallel as part of migrating the virtual machine to the second hypervisor.

18. The non-transitory computer-readable storage medium of claim 17, wherein the creating of the first association and the creating of the second association are performed in view of detecting a change in a number of the plurality of active streams.

19. A system, comprising:
a memory;
a processing device; and
a hypervisor having access to the memory and executed by the processing device, wherein the hypervisor is to:
maintain mapping data to track respective associations between each one of a plurality of memory areas in a virtual machine and one of a plurality of active streams for migrating the virtual machine to a second hypervisor;
create a first association between a first memory area in the plurality of memory areas and a first active stream from the plurality of active streams, the first association being created in the mapping data for a first phase of the migrating;
create a second association between a second memory area in the plurality of memory areas and a second active stream from the plurality of active streams, the second association being created in the mapping data for the first phase of the migrating;
send an update for the first memory area from the first phase of the migrating to the second hypervisor via the first active stream in view of the mapping data;
send an update for the second memory area from the first phase of the migrating to the second hypervisor via the second active stream in view of the mapping data;
modify the mapping data for a second phase of the migrating in view of an available third active stream by remapping respective sets of one or more memory areas from the plurality of memory areas across the first active stream, the second active stream, and the third active stream; and
send respective updates for one or more of the remapped memory areas to the second hypervisor in view of the modified mapping data in association with the second phase of the migrating.

20. The system of claim 19, wherein the creating of the first association between the first memory area and the first active stream and the creating of the second association between the second memory area and the second active stream is performed in view of historical utilization of the plurality of memory areas of the virtual machine.

* * * * *